US006832106B2

(12) United States Patent
Sugata et al.

(10) Patent No.: US 6,832,106 B2
(45) Date of Patent: Dec. 14, 2004

(54) ELECTROACOUSTIC TRANSDUCER

(75) Inventors: Hiroshi Sugata, Fussa (JP); Kenta Yujima, Akishima (JP)

(73) Assignee: Foster Electric Co., Ltd., Tokyo (JP)

( * ) Notice: Subject to any disclaimer, the term of this patent is extended or adjusted under 35 U.S.C. 154(b) by 0 days.

(21) Appl. No.: 10/441,723

(22) Filed: May 20, 2003

(65) Prior Publication Data

US 2003/0219141 A1 Nov. 27, 2003

(30) Foreign Application Priority Data

May 21, 2002 (JP) ....................................... 2002-145684

(51) Int. Cl.[7] ................................................ H04M 1/00

(52) U.S. Cl. .................... 455/567; 455/550.1; 381/430; 381/423

(58) Field of Search .............................. 455/567, 550.1, 455/575.1; 381/430, 423; 181/157, 173

(56) References Cited

U.S. PATENT DOCUMENTS

| | | | | |
|---|---|---|---|---|
| 3,665,124 A | * | 5/1972 | Sotome | 181/173 |
| 3,935,400 A | * | 1/1976 | Koga | 181/173 |
| 4,163,876 A | * | 8/1979 | Ohnuki | 181/174 |
| 4,914,750 A | * | 4/1990 | Lawson | 381/430 |
| 5,524,151 A | * | 6/1996 | Bleim | 381/396 |
| 5,727,077 A | * | 3/1998 | Frasl | 381/396 |
| 6,154,556 A | * | 11/2000 | Takahashi et al. | 381/430 |
| 6,389,148 B1 | * | 5/2002 | Yoo et al. | 381/423 |

FOREIGN PATENT DOCUMENTS

| | | |
|---|---|---|
| JP | 50-39925 A | 4/1975 |
| JP | 55-071394 | 5/1980 |
| JP | 08-307984 | 11/1996 |
| JP | 09-037385 | 2/1997 |

* cited by examiner

*Primary Examiner*—Edward F. Urban
*Assistant Examiner*—Lana Le
(74) *Attorney, Agent, or Firm*—Lynn & Lynn

(57) ABSTRACT

A diaphragm for electroacoustic transducers including loudspeakers as formed substantially in a dome shape having an outer periphery of a circular shape and made excellent in tone quality is provided. The dome shape of the diaphragm has an irregular section with a central arcuate edge line of a radius of curvature across the circular outer periphery and passing through an apex of the dome shape, and side surfaces formed on both sides of the central edge line respectively to have side edge lines intersecting at right angles the central edge line and having a radius of curvature larger than that of the central edge line. The side edge lines of both side surfaces are of constant radius of curvature at least in one of the surfaces or of mutually equal radius of curvature at all positions intersecting the central edge line, to be mutually asymmetric or symmetric for dispersing resonating portions over the whole area of the dome shape.

12 Claims, 7 Drawing Sheets

ELECTROACOUSTIC TRANSDUCER

BACKGROUND OF THE INVENTION

1. Technical field of the Invention

This invention relates generally to electroacoustic transducers and, more particularly, to an electroacoustic transducer including loudspeakers employing a diaphragm substantially of a dome shape having an irregular sectional shape.

2. Related Art

The electroacoustic transducers employ the diaphragm of various types including a cone shape, planar shape and so on as adapted to reproduced sound of bass, middle and so on, in which there has been a dome-shaped diaphragm designed specifically for reproducing a high range of audio frequency.

Referring to an example of a known electroacoustic transducer such as a loudspeaker unit utilizing the dome-shaped diaphragm, this diaphragm is circular in its plan view and semicircular in a side view and is thus formed to be hemispheric as a whole, the hemispherical diaphragm is supported at outer peripheral part through an edge member onto a magnetic circuit, and a voice coil is wound on outer periphery at one end part of a cylindrical voice-coil bobbin coupled at the other end to the outer peripheral part of the diaphragm, and the voice coil is positioned in a gap of the magnetic circuit so that the diaphragm can vibrate in response to voice signals provided to the coil for radiating sounds. The magnetic circuit comprises a yoke having a center pole, an annular permanent magnet placed around the center pole, and an annular top plate placed on the magnet to define the gap between the inner periphery of the top plate and the outer periphery of the center pole.

SUMMARY OF THE INVENTION

<Problem to be Solved by the Invention>

This dome-shaped, hemispherical diaphragm is in axial symmetry in which the distance between an apex of the dome shape and all circumferential positions at the outer periphery along which the voice coil bobbin is coupled is equal all over the circumferential positions, and the vibration transmitted from the voice coil to the outer periphery of the diaphragm is caused to concentrate at the apex in equiphase so that resonance is apt to occur in the mode of axial symmetry so as to cause the frequency characteristic curve to involve remarkable peak dips specifically in the higher range of the audio frequency, whereby it has been made unable to attain an excellent tone quality.

Attempts have been suggested to remove such problem of the axially symmetrical mode of the resonance, in some of which suggestions the dome-shaped diaphragm has been made irregular in the section for inducing axially asymmetrical mode of resonance. For example, in JP-A 50-39925 of Apr. 12, 1975, it is suggested to form the diaphragm substantially in a dome shape but having different distances between a top central portion and all circumferential positions at the outer peripheral driving end. In JP-A 55-71394 of May 29, 1980, further, the dome-shaped diaphragm is suggested to be formed to have an axially asymmetric top projection. With these attempts, however, the shape possible in the suggested formation should vary in a rather wide range so as to be difficult to determine definitely any practically effective shape, and the effect of these suggestions is still uncertain and not reliable in respect of intended removal of the peak dips in the higher frequency range.

The present invention has been suggested in view of the foregoing and its object is to provide an electroacoustic transducer employing a substantially dome-shaped diaphragm for the electroacoustic transducers capable of attaining the excellent tone quality.

<Measures for Solving the Problem>

The present invention establishes the above object by providing an electroacoustic transducer comprising a diaphragm formed substantially in a dome shape having a circular outer periphery and caused to vibrate in response to one of an external acoustic energy and an internal electric energy, and an electric system including a voice coil coupled to the diaphragm to vibrate together therewith for one of conversion of vibrations of the diaphragm responsive to the acoustic energy into corresponding electric signals and of electric signals corresponding to sounds to be reproduced into acoustic energy through the vibration of the diaphragm; the dome shape of the diaphragm including a central arcuate ridge line of a first radius of curvature across the circular outer periphery and passing through an apex of the dome shape, and surfaces formed on both sides of the central ridge line respectively with side sectional line intersecting at right angles with the central ridge line and having a second radius of curvature larger than the first radius of curvature of the central edge line.

The present invention further provides, for attaining the foregoing object, a loudspeaker comprising a magnetic circuit including a yoke having a center pole and a peripheral plate, an annular magnet placed on the peripheral plate of the yoke, and a top plate placed on the magnet to form a gap between an inner periphery of the top plate and an outer periphery of the center pole, and a diaphragm assembly including at least a diaphragm of a dome shape having a circular outer periphery, a cylindrical voice-coil bobbin coupled to the diaphragm and carrying a voice coil on outer periphery of the bobbin, and an annular edge coupled at inner periphery to the diaphragm and secured stationary at outer peripheral part; wherein the dome shape of the diaphragm includes a central arcuate ridge line of a radius of curvature diametrally across the circular outer periphery and passing through an apex of the dome shape, and surfaces formed on both sides or the central ridge line respectively with side sectional lines intersecting at right angles the central ridge line and having a radius of curvature larger than that of the central edge line.

In the diaphragm employed either in the transducer or loudspeaker according to the present invention, the second radius of curvature of the side sectional lines of one of both side surfaces and/or of the other side surface is constant.

In the diaphragm of the present invention, further, the second radius of curvature of the side edge lines in one of both side surfaces is equal to that of the side edge lines in the other side surface.

BRIEF DESCRIPTIONS OF THE DRAWINGS

Figure 1:
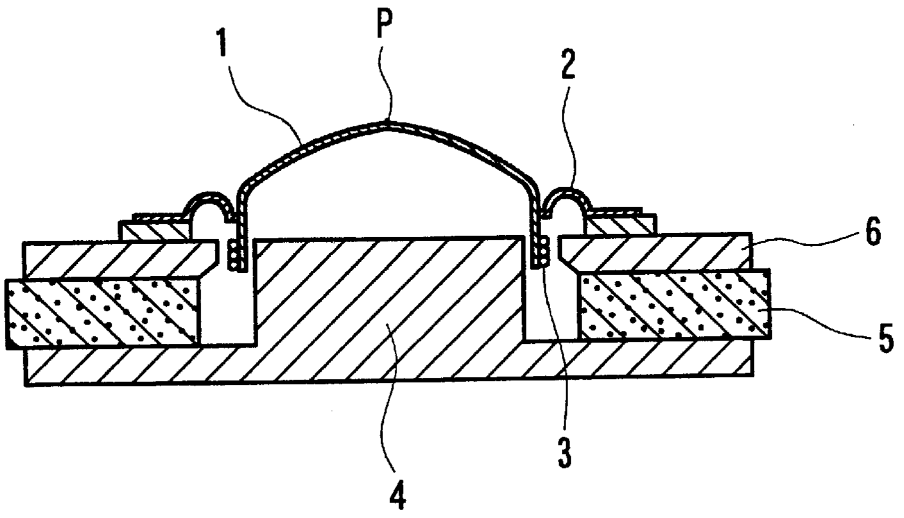
FIG. 1 shows in a vertically sectioned view a structure of an electroacoustic transducer or a loudspeaker employing the diaphragm in an embodiment according to the present invention.

While the present invention shall now be described in detail with reference to the respective embodiments shown in the drawings, it should be appreciated that the intention is not to limit the invention only to these embodiments shown but rather to include all alterations, modifications and equivalent arrangements possible within the scope of appended claims.

DESCRIPTION OF THE PREFERRED EMBODIMENTS

Referring first to an embodiment in the form of an electroacoustic transducer employing a dome-shaped diaphragm according to the present invention, as shown in FIG. 1, the transducer generally comprises the dome-shaped diaphragm 1, as will be detailed later, the diaphragm having a circular outer periphery at which the diaphragm 1 is supported through an annular edge 2 onto a later described magnetic circuit, while the circular outer periphery continues to a top end of a cylindrical voice-coil bobbin having a voice coil 3 wound on outer periphery at the other bottom end part of the bobbin. The diaphragm and bobbin may be prepared in a mutually integral body or respectively separately. The magnetic circuit comprises, for example, a generally disk-shaped yoke 4 having a center pole, an annular permanent magnet 5 disposed on the yoke 4 to surround its center pole, and an annular plate 6 disposed on the magnet 5 to define a magnetic gap between inner periphery of the plate 6 and outer periphery of the center pole of the yoke 4. The voice coil 3 on the bottom end part of the bobbin is disposed within this magnetic gap, with the edge 2 secured at its outer peripheral part onto the plate 6 through an annular support member.

Figure 2A:
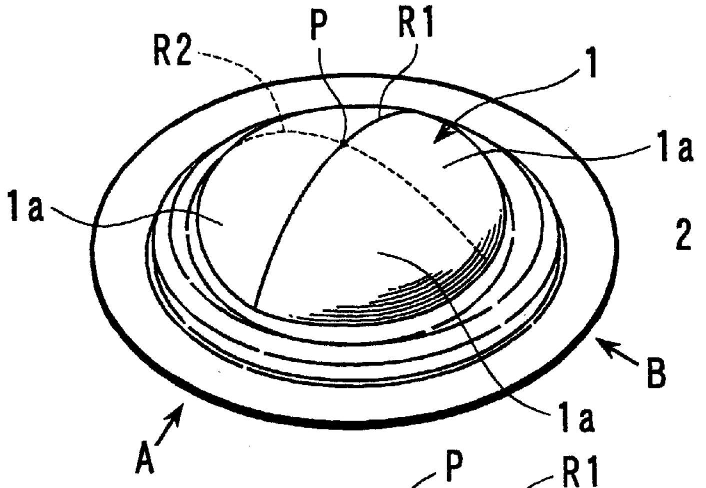
FIG. 2A is a perspective view of the diaphragm in the embodiment according to the present invention, with an edge member assembled.
Figure 2B:
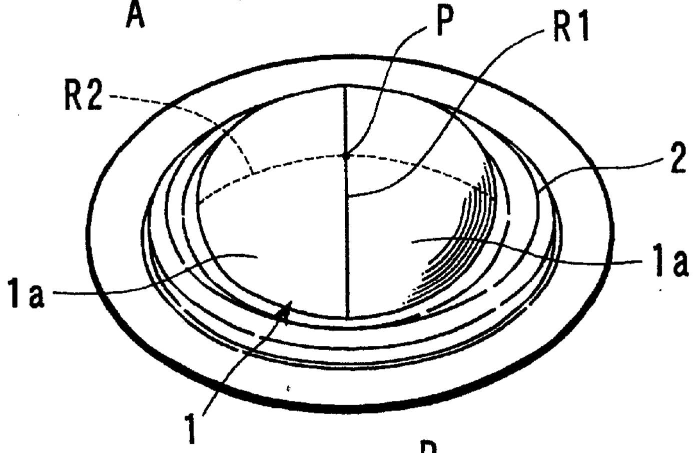
FIG. 2B is a perspective view of the diaphragm in FIG. 2A in the assembly as seen in a direction of an arrow A shown therein.
Figure 2C:
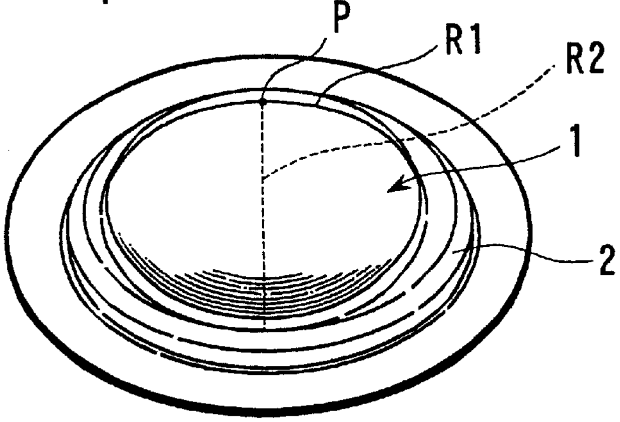
FIG. 2C is another perspective view of the diaphragm in FIG. 2A as seen in a direction of an arrow B.
Figure 3A:
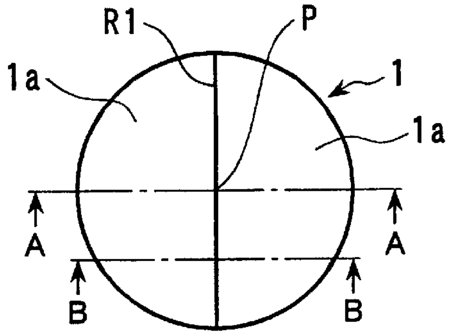
FIG. 3A is a plan view of the diaphragm according to the present invention, with the edge member disassembled.
Figure 3C:
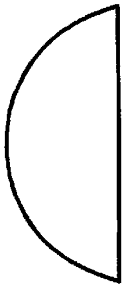
FIG. 3C is a side view of the diaphragm in FIG. 3A.
Figure 3B:
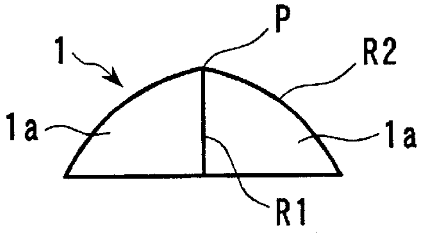
FIG. 3B is a front view of the diaphragm in FIG. 3A.
Figure 4A:
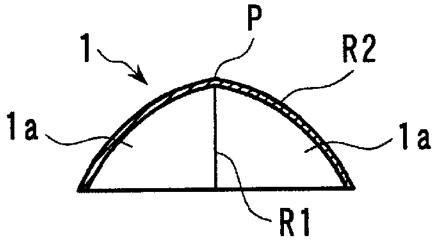
FIG. 4A is a sectioned view of the diaphragm in FIG. 3A as taken along line A—A shown therein.

Referring now in detail to the dome-shaped diaphragm 1 employed in the embodiment of FIG. 1, in an aspect of the diaphragm according to the present invention as shown in FIGS. 2–4, the diaphragm 1 is shown here as assembled with the edge 2, in which the diaphragm 1 is formed with a film of, for example, PPTA (poly paraphenylene terephthalamide) as molded substantially into the dome shape of circular outer periphery.

The particular diaphragm 1 of the present invention is featured in its dome shape, which is circular at the outer periphery and has an apex P in the center, and the dome shaped surface of which is formed to have an arcuate central edge line R1 passing through the apex P and a pair of surfaces 1*a* on both sides of the central edge line R1 to be symmetric with respect to the central edge line as seen in FIGS. 2–4. The central edge line R1 is formed arcuate having a predetermined radius of curvature $R_1$ to be semi-circular preferably, while the shape is not limited thereto in the present invention.

Further, these side surfaces 1*a* are formed respectively to have a side edge line R2 which intersects at right angles the central edge line R1 at the position of the apex P and is formed to have a radius of curvature $R_2$ which is larger than the radius of curvature $R_1$ of the central edge line R1.

Figure 4B:
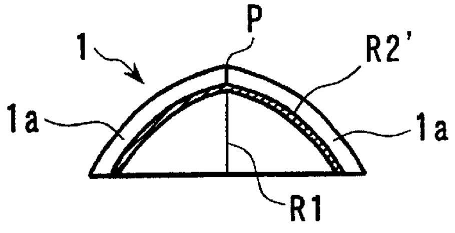
FIG. 4B is a sectioned view of the diaphragm in FIG. 3A as taken along line B—B shown therein.

As shown, for example, in FIG. 4B, further, the side surfaces 1*a* are so formed that other n-th side edge line R2' is also of the radius of curvature $R_2$ larger than the radius of curvature $R_1$ of the central edge line R1.

Figure 5A:
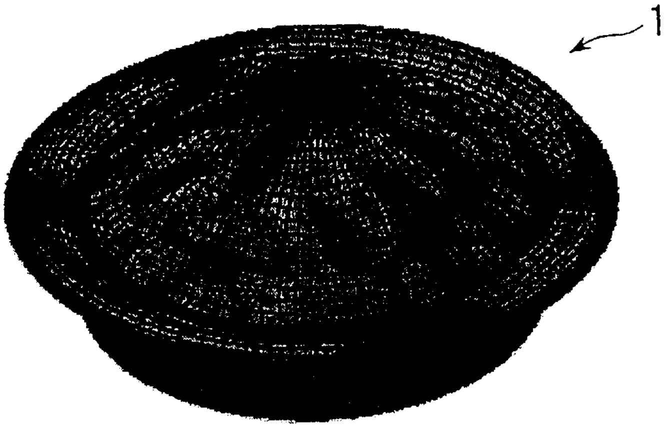
FIGS. 5A and 5B show simulation states of free vibration mode at different frequencies of the diaphragm in the embodiment according to the present invention, as shown by means of the finite element method.
Figure 5B:
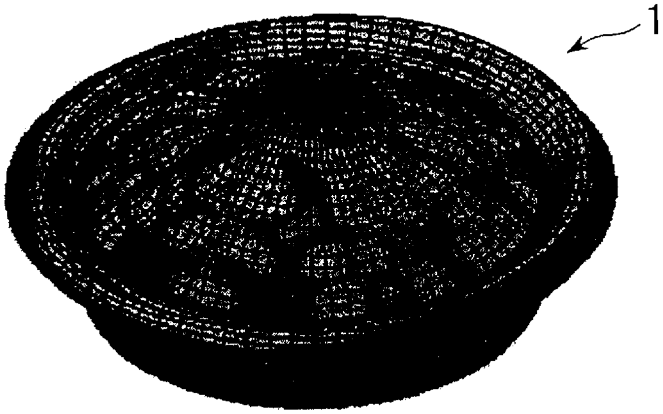

In FIGS. 5A and 5B, the simulation in the free vibration mode made by means of the finite element method in respect of the diaphragm 1 according to the present invention is shown, in which there can be seen no resonance of the axial symmetry mode in such high range of frequency as 28,135 Hz in FIG. 5A and as 35,184 Hz in FIG. 5B.

Figure 6A:
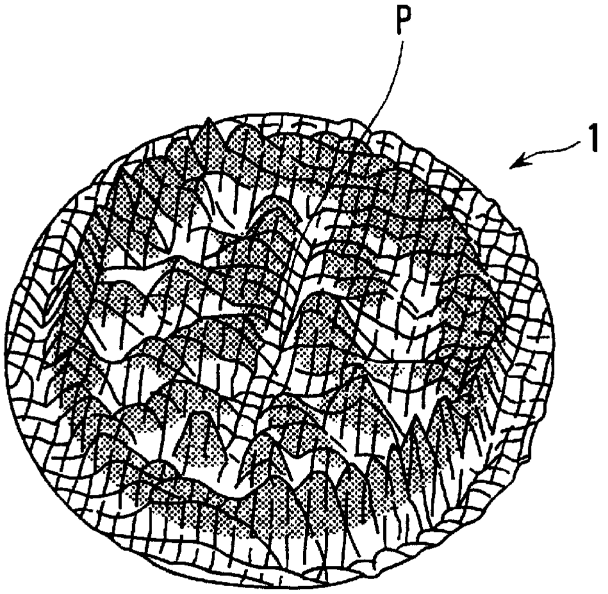
FIGS. 6A and 6B are measured diagrams of vibration mode respectively of the diaphragms in the embodiment according to the present invention and of a conventional diaphragm.
Figure 6B:
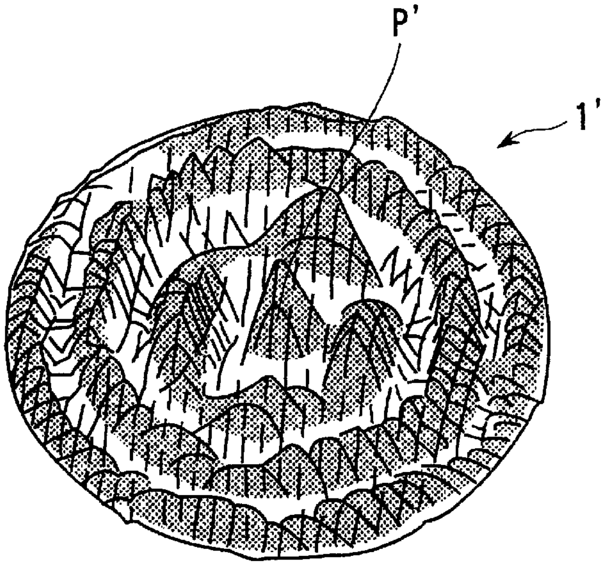

In the measurements of the vibration mode at 35 KHz as shown in FIG. 6A as to the diaphragm of the specific dome shape according to the present invention and in FIG. 6B as to a conventional diaphragm of a general dome shape but formed with the same material as the diaphragm of the present invention, the resonance of the axial symmetry mode occurring substantially in ring-shaped portions around the apex P' in the conventional diaphragm of FIG. 6B has been unable to be seen in the diaphragm of the present invention of FIG. 6A nor any resonance of axially symmetrical mode which expanding radially from the apex P of such irregular dome shape according to the present invention, whereas the vibration mode of the diaphragm according to the present invention has been recognized to have resonating portions which are rather dispersed over the entire area of the irregular dome shape.

Figure 7:
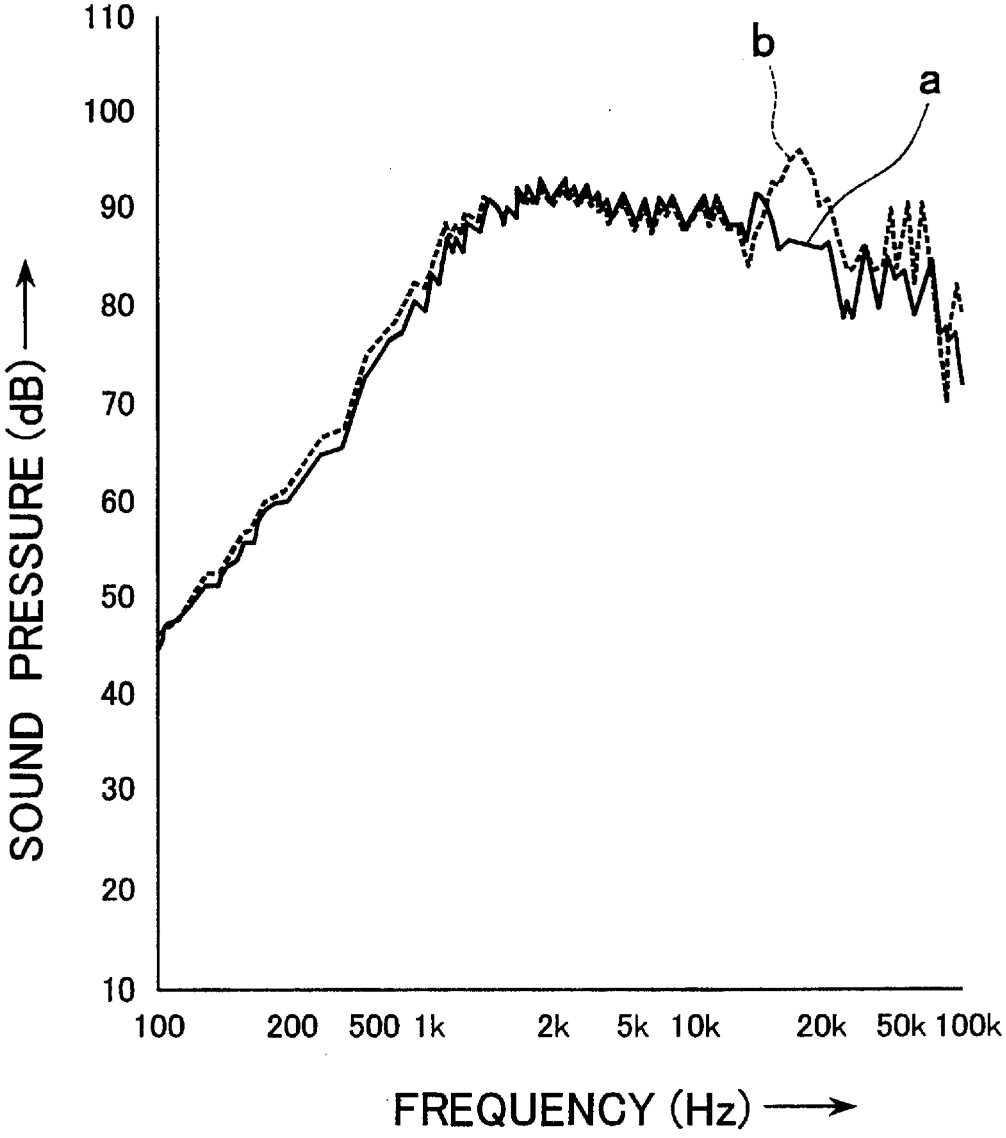
FIG. 7 is a diagram of frequency characteristics of the loudspeaker employing the diaphragms of the present invention as shown by a curve “a” and of the loudspeaker employing a conventional diaphragm as shown by a curve “b”

In the frequency characteristics shown in FIG. 7 in which the abscissa denotes the frequency (Hz) and the ordinate denotes the sound pressure (dB), the characteristic curve (a) in solid line of the loudspeaker employing the diaphragm according to the present invention shows that such remarkable peak dips occurring in the high frequency range as seen in the characteristic curve (b) in dotted line of the loudspeaker employing the conventional diaphragm are reduced to be flat in the characteristics and to be improved in the tone quality.

Figure 8A:
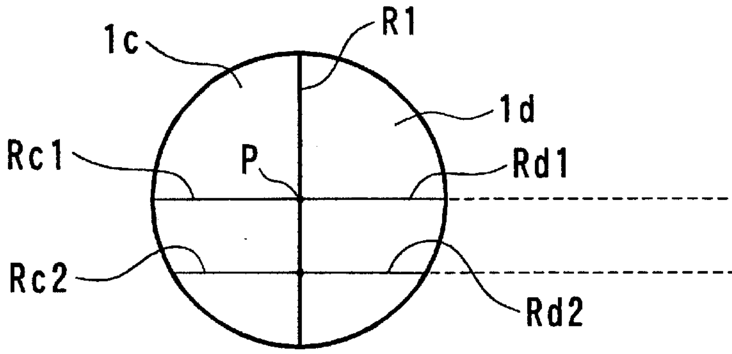
FIGS. 8A to 8C are respectively plan, front and side views for explaining certain further embodiments of the diaphragm according to the present invention.
Figure 8C:
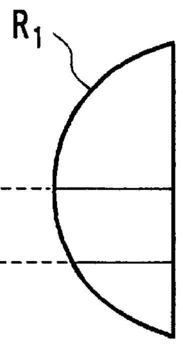
Figure 8B:
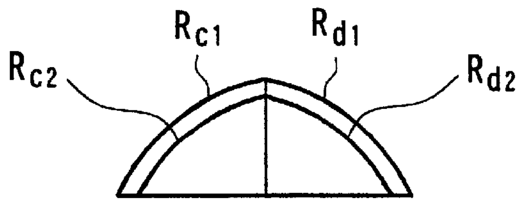

Referring next to another embodiment of the present invention with reference to explanatory views of FIGS. 8A–8C therefor, the diaphragm is also provided with the central ridge line R1 of the predetermined radius of curvature $R_1$ in the arcuate form, and with surfaces 1*c* and 1*d* on both sides of the central ridge line R1. While the arcuate central edge line R1 is shown to be semicircular here, the present invention is not required to be limited thereto.

The side surfaces 1*c* and 1*d* also have respectively the side edge lines Rc1 and Rd1 which intersect at right angles the central edge line R1 at the position of the apex P thereof and have the radius of curvature $R_{C1}$ and $R_{d1}$ Other side sectional lines Rc2 and Rd2 of the side surfaces 1*c* and 1*d* which intersecting at right angles with the central ridge line R1 at all other positions than the apex P are of the radius of curvature $R_{C2}$ and $R_{d2}$ as shown in FIG. 8. In the present embodiment, the side surfaces 1*c* and 1*d* are of a shape which satisfies a following relationship in their radios of curvature:

$$R_1<R_{c1},R_{d1},R_{c2},R_{d2}$$

With the diaphragm for the electroacoustic transducers which has the shape satisfying the above relationship in the radius of curvature, it is also possible to attain the same effect as in the case of the foregoing embodiment of FIGS. 2–4.

Referring next to a further embodiment according to the present invention with reference also to FIG. 8, the side surfaces 1*c* and 1*d* of the diaphragm are of a shape satisfying a following relationship in their radius of curvature:

$$R_1<R_{c1},R_{d1},R_{c2},R_{d2}$$

$$R_{c1}=R_{c2}=C1$$

wherein C1 denotes any optional constant.

Also with the diaphragm satisfying such relationship in the radius of curvature, it is possible to attain the same effect as in the foregoing embodiment of FIGS. 2–4.

Referring next to a further embodiment of the present invention also with reference to FIG. 8, the side surfaces 1*c* and 1*d* of the diaphragm are of a shape satisfying a following relationship in the radius of curvature:

$$R_1<R_{c1},R_{d1}, R_{c2},R_{d2}$$

$$R_{d1}=R_{d2}=C2$$

wherein C2 denotes any optional constant.

With this diaphragm which satisfying this relationship, too, it is possible to attain the same effect as in the case of the embodiment of FIGS. 2–4.

Referring now to another embodiment of the present invention also with reference to FIG. 8, the side surfaces 1*c* and 1*d* of the diaphragm are of a shape satisfying such relationship as follows in the radius of curvature:

$$R_1<R_{c1},R_{d1},R_{c2},R_{d2}$$

$$R_{c1}=R_{c2}=C1$$

$$R_{d1}=R_{d2}=C2$$

With this diaphragm of the shape satisfying the above relationship in the radius of curvature according to the present invention, too, the same effect as in the case of the foregoing embodiment of FIGS. 2–4 can be obtained.

Referring further to another embodiment of the present invention also with reference to FIG. 8, the side surfaces 1*c* and 1*d* of the diaphragm are of a shape satisfying such relationship as follows in the radius of curvature:

$$R_1<R_{c1},R_{c2},R_{d1},R_{d2}$$

$$R_{c1}=R_{d1}$$

$$R_{c2}=R_{d2}$$

The side surfaces 1*c* and 1*d* of the diaphragm which satisfy the above relationship are of a shape mutually symmetrical with respect to the central ridge line R1 and with the diaphragm having such side surfaces 1*c* and 1*d*, it is possible to attain the same effect as in the case of the foregoing embodiment of FIGS. 2–4.

Figure 9:
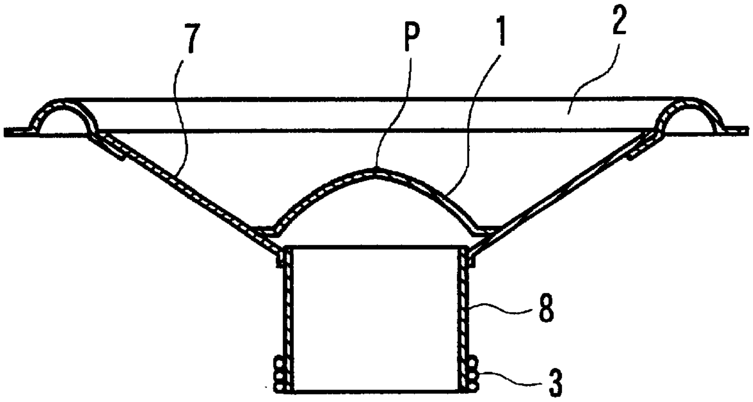
FIG. 9 shows in a vertically sectioned view a loudspeaker employing in assembly a cone-shaped and dome-shaped diaphragms in a further embodiment according to the present invention.

Referring finally to another aspect of the present invention with reference to FIG. 9 showing a diaphragm assembly for the electroacoustic transducer or loudspeaker, the dome-shaped diaphragm 1 is employed in combination with a cone-shaped diaphragm 7. In the present case, the cone-shaped diaphragm 7 is coupled at its inner circular periphery to the outer periphery at the top end part of the voice-coil bobbin 8 carrying the voice coil 3 wound on the outer periphery at the bottom end part thereof. The diaphragm 1 of the dome shape in any one of the foregoing embodiments is coupled at its outer periphery to an upper surface of the cone-shaped diaphragm adjacent to the inner periphery thereof for covering open end of the cylindrical voice-coil bobbin 8 and for simultaneous vibration with the bobbin 8 and cone-shaped diaphragm 7, so that the dome-shaped diaphragm 1 will act as a center cap or dust cap. In this case, the dome-shaped diaphragm 1 is driven at the outer periphery by the cone-shaped diaphragm so as to radiate sounds from the dome-shaped surface, similar to the foregoing embodiments. In the frequency characteristic curve also in the present embodiment, the curve can be further smoothed specifically in the high frequency range.

While in the above aspect the dome-shaped diaphragm 1 is shown to be coupled to the cone-shaped diaphragm 7, it is of course possible for the same effect to couple the diaphragm 1 to the open top end of the bobbin 8.

In the respective foregoing embodiments, the reference has been made to PPTA film as the material for making the diaphragm, whereas any other resin film of PET (polyethylene terephthalate), PEN (polyethylene naphthalate), 2,6 PEN (polyethylene 2,6 naphthalate) or the like, aluminum film, titanium film and the like will also be employable, and substantially the same effect can be expected to be attainable.

As has been described, according to the present invention, the dome shape of the diaphragm for use in the electroacoustic transducers is formed to have the central, arcuate ridge line R1 passing through the apex I', and the surfaces made on both sides of the central ridge line respectively with the it intersecting edge lines of a radius of curvature larger than that of the central ridge line to be mutually symmetric or asymmetric, whereby there can be attained such effect that the resonance occurring in the surfaces is dispersed in their whole area, any remarkable peak dips conventionally appearing particularly in the higher range of the frequency characteristics can be reduced, and the tone quality can be improved to be excellent.

What is claimed is:

1. An electroacoustic transducer comprising a diaphragm formed substantially in a dome shape having a circular outer periphery and arranged to vibrate in response to one of an external acoustic energy and an internal electric energy, and an electric system including a voice coil coupled to the diaphragm to vibrate together therewith for one of conversion of vibrations of the diaphragm responsive to the acoustic energy into corresponding electric signals and of electric signals corresponding to sounds to be reproduced into acoustic energy through the vibration of the diaphragm; the dome shape of the diaphragm including a central arcuate ridge line of a first radius of curvature across the circular outer periphery and passing through an apex of the dome shape, and surfaces formed on both sides of the central arcuate ridge line respectively with side sectional line intersecting at right angles with the central arcuate ridge line and having a second radius of curvature larger than the first radius of curvature of the central arcuate ridge line.

2. The transducer according to claim 1 wherein, in the dome shape of the diaphragm, the second radius of curvature of the side sectional lines of at least one of both side surfaces is constant at every intersecting position with the central arcuate ridge line.

3. The transducer according to claim 1 wherein in the dome shape of the diaphragm the second radius of curvature of the side sectional lines in one of both side surfaces is equal to that of the side sectional lines in the other side surface.

4. A loudspeaker comprising a magnetic circuit including a yoke having a center pole and a peripheral plate, an annular magnet placed on the peripheral plate of the yoke, and a top plate placed on the magnet to form a magnetic gap between an inner periphery of the top plate and an outer periphery of the center pole; and a diaphragm assembly having a circular outer periphery and including at least a diaphragm of a dome shape having a circular outer periphery, a cylindrical voice-coil bobbin coupled to the diaphragm assembly and carrying a voice coil on an outer periphery of the bobbin, and an annular edge coupled at an inner periphery to the circular outer periphery of the diaphragm assembly and secured stationary at the outer peripheral part; wherein the dome shape of the diaphragm includes a central arcuate ridge line of a first radius of curvature diametrally across the circular outer periphery and passing through an apex of the dome shape, and surfaces formed on both sides of the central arcuate ridge line respectively with side sectional lines intersecting at right angles with the central arcuate ridge line and having a second radius of curvature larger than the first radius of curvature of the central arcuate ridge line.

5. The loudspeaker according to claim 4 wherein in the dome shape of the diaphragm, the second radius of curvature of the side sectional lines of at lease one of both side surfaces is constant at every intersecting position with the central arcuate ridge line.

6. The loudspeaker according to claim 4 wherein in the dome shape of the diaphragm, the second radius of curvature of the side sectional lines in one of both side surfaces is equal to that of the side sectional lines in the other side surface.

7. The loudspeaker according to claim 4 wherein the diaphragm assembly further includes an annular cone-shaped diaphragm, an outer periphery of which providing the circular outer periphery of the diaphragm assembly and an inner periphery of which being coupled to the voice-coil bobbin.

8. The loudspeaker according to claim 7 wherein the diaphragm of the dome shape having the central arcuate ridge line is coupled at the circular outer periphery to an axial end of the cylindrical voice-coil bobbin, the voice coil being wound on the outer periphery at the other axial end part of the bobbin.

9. The loudspeaker according to claim 7 wherein the diaphragm of the dome shape having the central arcuate ridge line is coupled at the circular outer periphery to a portion adjacent to the inner periphery of the cone shape diaphragm, which inner periphery being coupled to an axial end of the cylindrical voice-coil bobbin, the voice coil being wound on an outer periphery at the other axial end part of the bobbin.

10. A diaphragm for electroacoustic transducers, the diaphragm being formed substantially in a dome shape having an outer periphery of a circular shape, the dome shape including a central arcuate ridge line of a first radius of curvature across the circular outer periphery and passing through an apex of the dome shape, and surfaces formed on both sides of the central arcuate ridge line respectively with side sectional lines intersecting at right angles with the central arcuate ridge line and having a second radius of curvature larger than the first radius of curvature of the central arcuate ridge line.

11. The diaphragm according to claim 10 wherein the second radius of curvature of the side sectional lines of at least one of both side surfaces is constant at every intersecting position with the central arcuate ridge line.

12. The diaphragm according to claim 10 wherein the second radius of curvature of the side sectional lines in one of both side surfaces is equal to that of the side sectional lines in the other side surface.

* * * * *